United States Patent
Xu et al.

(10) Patent No.: US 12,454,708 B2
(45) Date of Patent: Oct. 28, 2025

(54) USE OF BIOLOGICAL ENZYME FOR PREPARING ORLISTAT INTERMEDIATE, AND PREPARATION METHOD

(71) Applicant: ZEIN BIOTECHNOLOGY CO., LTD., Chongqing (CN)

(72) Inventors: Tianshuai Xu, Chongqing (CN); Dayong Gong, Chongqing (CN); Yumei Xiao, Chongqing (CN); Zhanghong Wang, Chongqing (CN); Zhichuan Huang, Chongqing (CN); Shan Huang, Chongqing (CN); Lei Zhang, Chongqing (CN); Xin Gao, Chongqing (CN); Junwei Shen, Chongqing (CN)

(73) Assignee: ZEIN BIOTECHNOLOGY CO., LTD., Chongqing (CN)

( * ) Notice: Subject to any disclaimer, the term of this patent is extended or adjusted under 35 U.S.C. 154(b) by 515 days.

(21) Appl. No.: 17/790,787

(22) PCT Filed: Jan. 6, 2021

(86) PCT No.: PCT/CN2021/070495
§ 371 (c)(1),
(2) Date: Jul. 5, 2022

(87) PCT Pub. No.: WO2021/139689
PCT Pub. Date: Jul. 15, 2021

(65) Prior Publication Data
US 2024/0158819 A1    May 16, 2024

(30) Foreign Application Priority Data
Jan. 7, 2020    (CN) .......................... 202010015510.1

(51) Int. Cl.
*C12P 7/42*    (2006.01)
*C12N 1/21*    (2006.01)
*C12N 9/04*    (2006.01)
*C12N 15/62*    (2006.01)

(52) U.S. Cl.
CPC .............. *C12P 7/42* (2013.01); *C12N 9/0006* (2013.01); *C12N 15/62* (2013.01); *C07K 2319/00* (2013.01); *C12Y 101/01002* (2013.01); *C12Y 101/01047* (2013.01)

(58) Field of Classification Search
None
See application file for complete search history.

(56) References Cited

FOREIGN PATENT DOCUMENTS

| CN | 101348475 A | 1/2009 |
|----|-------------|--------|
| CN | 101538285 B | 12/2011 |
| CN | 102976940 A | 3/2013 |
| CN | 108484536 A | 9/2018 |
| CN | 109022473 A | 12/2018 |
| CN | 111154736 A | 5/2020 |
| WO | 2007029086 A2 | 3/2007 |

OTHER PUBLICATIONS

GenBank Accession No. WP_015245403.1 (Jun. 20, 2019).
GenBank Accession No. WP_010403640.1 (Jun. 18, 2019).
GenBank Accession No. EGU12837 (Dec. 3, 2013).
Xu et al., A New Route for the Preparation of Orlistat, Organic Chemistry, Aug. 31, 2010, 1175-1179, vol. 30 (8), China.
Bai et al., Operon for Biosynthesis of Lipstatin, the Beta-Lactone Inhibitor of Human Pancreatic Lipase, Applied and Enviromental Microbiology, 7473-7483, Sep. 19, 2014, vol. 80 (24).
GenBank Accession No. WP_074317782.1 (Jun. 18, 2019).
Sun et al., Preparation of Orlistat Intermediate Estercycloketone, Shanghai Medical and Pharmaceutical Journal, Dec. 31, 2004, 1-22, vol. 25 (6) , China.
Bian et al., Graphical Synthetic Routes of Orlistat, Chinese Journal of Pharmaceuticals, Dec. 31, 2006, 716-720,, vol. 37 (10), China.
GenBank Accession No. AFQ56330.1 (Jul. 31, 2014).
Database Uniport KB, accession No. L0DC34 [online], Mar. 6, 2013, searched Aug. 4, 2023, https://www.uniprot.org/uniprotkb/L0DC34/entry.

*Primary Examiner* — Todd M Epstein

(57) ABSTRACT

Provided is a method for biosynthesis of (R)-β-hydroxytetradecanoate compounds. The method comprises the following steps of: reacting β-carbonyl tetradecanoate in a ketoreductase and a glucose dehydrogenase or a fusion enzyme thereof, glucose, NADP$^+$ and a buffer solution to obtain (R)-β-hydroxytetradecanoate compounds. The method is an enzyme-catalyzed biosynthesis method having simple operations, conventional equipment and an environmentally friendly process, and the prepared product has high purity, high yield and a high ee value.

18 Claims, 3 Drawing Sheets
Specification includes a Sequence Listing.

SEQUENCE LISTING

<160> NUMBER OF SEQ ID NOS: 9

<210> SEQ ID NO 1
<211> LENGTH: 249
<212> TYPE: PRT
<213> ORGANISM: Artificial Sequence
<220> FEATURE:
<223> OTHER INFORMATION: Ketoreductase enzyme amino acid sequence SEQ ID
      NO: 1

<400> SEQUENCE: 1

Met Gly Lys Leu Asp Asn Lys Val Ala Val Ile Thr Gly Gly Asn Ser
1               5                   10                  15

Gly Met Gly Leu Ala Thr Ala Gln Arg Phe Val Ser Glu Gly Ala Tyr
            20                  25                  30

Val Phe Ile Thr Gly Arg Arg Gln Ala Glu Leu Asp Lys Ala Val Asp
        35                  40                  45

Leu Ile Gly Lys Asn Val Thr Gly Val Gln Gly Asp Val Ser Asn Leu
    50                  55                  60

Ala Asp Leu Asp Arg Leu Tyr Ala Thr Val Lys Glu Gln Lys Gly Arg
65                  70                  75                  80

Val Asp Val Leu Phe Ala Asn Ala Gly Val Gly Glu Leu Ala Pro Leu
                85                  90                  95

Gly Ser Ile Thr Glu Glu Gln Phe Asp Lys Val Phe Asn Ile Asn Val
            100                 105                 110

Arg Gly Leu Leu Phe Thr Val Gln Lys Ala Leu Pro Leu Phe Gln Asp
        115                 120                 125

Gly Gly Ser Ile Ile Leu Asn Ala Ser Ile Ala Ser Ile Lys Gly Met
    130                 135                 140

Pro Ala Phe Ser Val Tyr Ser Ala Ser Lys Ala Ala Val Arg Ser Phe
145                 150                 155                 160

Ala Arg Ser Trp Thr Val Asp Leu Lys Gly Arg Lys Ile Arg Ile Asn
                165                 170                 175

Thr Leu Ser Pro Gly Pro Ile Asp Thr Pro Ile Leu Ser Gly Leu Ala
            180                 185                 190

Ser Thr Glu Glu Glu Leu Lys Gln Val Lys Ala Asp Leu Ala Ala Gln
        195                 200                 205

Val Pro Leu Gly Arg Met Gly Thr Ser Asp Glu Ile Ala Asn Val Ala
    210                 215                 220

Leu Phe Leu Ala Ser Asp Asp Ser Ser Tyr Val Thr Gly Ile Glu Leu
225                 230                 235                 240

Phe Val Asp Gly Gly Met Ala Gln Ile
                245

<210> SEQ ID NO 2
<211> LENGTH: 259
<212> TYPE: PRT
<213> ORGANISM: Artificial Sequence
<220> FEATURE:
<223> OTHER INFORMATION: Ketoreductase enzyme amino acid sequence SEQ ID
      NO: 2

<400> SEQUENCE: 2

Met Ala Arg Leu Ala Gly Lys Val Ala Leu Val Thr Gly Gly Ala Ser
1               5                   10                  15

Val Pro Gly Leu Gly Ser Ala Thr Ala Ile Arg Phe Ala Gln Glu Gly
            20                  25                  30

Ala Thr Val Tyr Leu Thr Asp Arg Asp Leu Ala Gly Ala Gln Ala Val

```
            35                  40                  45
Ala Ala Gln Ile Thr Ala Ala Gly Gly Arg Ala Thr Ala Leu Glu His
 50                  55                  60

Asp Val Thr Ser Glu Ala Asp Trp Asp Arg Val Leu Ala Ala Ile Asp
 65                  70                  75                  80

Ala Ala Glu Gly Arg Leu Asp Ile Leu Val Asn Asn Ala Gly Ile Ala
                 85                  90                  95

Val Leu Gly Pro Leu Glu Asp Val Thr Ala Ala Asp Phe Leu Arg Gln
                100                 105                 110

Asn Asp Val Asn Leu Asn Ser Val Phe His Gly Ser Lys Arg Ala Leu
                115                 120                 125

Val Met Met Arg Arg Pro Gly Asp Gly Gly Thr Ala Arg Gly Gly Ser
130                 135                 140

Ile Ile Asn Ile Ser Ser Val Ala Gly Leu Ile Gly Val Pro Gly Cys
145                 150                 155                 160

Gly Ser Tyr Ala Ala Ser Lys Gly Gly Val Arg Leu Phe Ser Lys Val
                165                 170                 175

Val Ala Leu Glu Gly Ala Ala Asp Gly Val Arg Cys Asn Ser Val His
                180                 185                 190

Pro Gly Met Ile Ala Thr Asn Ile Gln Gly Val Ala Leu Glu Asp Asn
                195                 200                 205

Ala Ala Asn Phe Asp Ala Val Met Ala Leu Ile Pro Met Val Arg Met
210                 215                 220

Gly Glu Pro Glu Asp Ile Ala Asn Met Asn Leu Phe Leu Ala Ser Asp
225                 230                 235                 240

Glu Ser Arg Tyr Ile Thr Gly Ala Glu Phe Val Val Asp Gly Gly Met
                245                 250                 255

Thr Ala Arg

<210> SEQ ID NO 3
<211> LENGTH: 263
<212> TYPE: PRT
<213> ORGANISM: Artificial Sequence
<220> FEATURE:
<223> OTHER INFORMATION: Glucose dehydrogenase

<400> SEQUENCE: 3

Met Tyr Met Tyr Pro Asp Leu Lys Gly Lys Val Val Ala Ile Thr Gly
 1               5                  10                  15

Ala Ala Ser Gly Leu Gly Lys Ala Met Ala Ile Arg Phe Gly Lys Glu
                 20                  25                  30

Gln Ala Lys Val Val Ile Asn Tyr Tyr Ser Asn Lys Gln Asp Pro Asn
                 35                  40                  45

Glu Val Lys Glu Glu Val Ile Lys Ala Gly Gly Glu Ala Val Val Val
 50                  55                  60

Gln Gly Asp Val Thr Lys Glu Glu Asp Val Lys Asn Ile Val Gln Thr
 65                  70                  75                  80

Ala Ile Lys Glu Phe Gly Thr Leu Asp Ile Met Ile Asn Asn Ala Gly
                 85                  90                  95

Leu Glu Asn Pro Val Pro Ser His Glu Met Pro Leu Lys Asp Trp Asp
                100                 105                 110

Lys Val Ile Gly Thr Asn Leu Thr Gly Ala Phe Leu Gly Ser Arg Glu
                115                 120                 125

Ala Ile Lys Tyr Phe Val Glu Asn Asp Ile Lys Gly Asn Val Ile Asn
130                 135                 140
```

```
Met Ser Ser Val His Glu Val Ile Pro Trp Pro Leu Phe Val His Tyr
145                 150                 155                 160

Ala Ala Ser Lys Gly Gly Ile Lys Leu Met Thr Glu Thr Leu Ala Leu
                165                 170                 175

Glu Tyr Ala Pro Lys Gly Ile Arg Val Asn Asn Ile Gly Pro Gly Ala
            180                 185                 190

Ile Asn Thr Pro Ile Asn Ala Glu Lys Phe Ala Asp Pro Lys Gln Lys
                195                 200                 205

Ala Asp Val Glu Ser Met Ile Pro Met Gly Tyr Ile Gly Glu Pro Glu
210                 215                 220

Glu Ile Ala Ala Val Ala Ala Trp Leu Ala Ser Lys Glu Ala Ser Tyr
225                 230                 235                 240

Val Thr Gly Ile Thr Leu Phe Ala Asp Gly Gly Met Thr Gln Tyr Pro
            245                 250                 255

Ser Phe Gln Ala Gly Arg Gly
            260

<210> SEQ ID NO 4
<211> LENGTH: 248
<212> TYPE: PRT
<213> ORGANISM: Artificial Sequence
<220> FEATURE:
<223> OTHER INFORMATION: Ketoreductase enzyme amino acid sequence SEQ ID
      NO: 4

<400> SEQUENCE: 4

Met Ser Ser Pro Ala Pro Thr Val Tyr Val Ile Ser Gly Ala Ser Arg
1               5                   10                  15

Gly Ile Gly Phe Ala Ile Thr Ser Ile Leu Ala Gln His Asp Asn Val
            20                  25                  30

Leu Ile Phe Ala Gly Ala Arg Asp Leu Lys Ser Ala Gln Leu Asn Glu
        35                  40                  45

Leu Ala Gln Lys Ser Ser Gly Lys Val Ile Pro Val Lys Leu Glu Ser
    50                  55                  60

Thr Ser Val Glu Asp Ala Ala Ala Leu Ala Lys Val Val Glu Glu Lys
65                  70                  75                  80

Ala Gly Lys Val Asp Tyr Val Leu Ala Val Ala Gly Ile Ser Gln Ser
                85                  90                  95

Thr Asp Pro Ile Ala Gln Val Ser Leu Asp Asp Val Arg Arg His Phe
            100                 105                 110

Glu Val Asn Thr Ile Gly Pro Leu Val Leu Phe Gln Ala Leu Leu Pro
        115                 120                 125

Leu Thr Thr Lys Ser Thr Ala Pro His Phe Ile Val Val Ser Thr Ile
    130                 135                 140

Ala Gly Ser Ile Ala Ser Met Pro Gln Val Thr Phe Pro Val Ser Ala
145                 150                 155                 160

Tyr Ala Ile Ser Lys Thr Ala Val Asn Ser Ala Val Gly Arg Ile Ala
                165                 170                 175

Ile Glu His Pro Asp Leu Asp Ala Phe Val Cys His Pro Gly Phe Val
            180                 185                 190

Ser Ser Asp Met Val Lys Gln Phe Ala Glu Lys Thr Gly Ala Pro Leu
        195                 200                 205

Ser Asp Phe Glu Ser Phe Gly Met Ile Thr Pro Glu Glu Ser Ala Ala
    210                 215                 220

Ser Leu Val Lys Leu Phe Asp Glu Ala Lys Lys Glu Thr His Ser Gly
```

```
                225                 230                 235                 240

Lys Phe Phe Asn Val Asp Gly Thr
            245

<210> SEQ ID NO 5
<211> LENGTH: 77
<212> TYPE: PRT
<213> ORGANISM: Artificial Sequence
<220> FEATURE:
<223> OTHER INFORMATION: Linker sequence

<400> SEQUENCE: 5

Glu Phe Glu Glu Glu Lys Lys Lys Gln Gln Glu Glu Glu Ala Glu
1               5                   10                  15

Arg Leu Arg Arg Ile Gln Glu Glu Met Glu Lys Glu Arg Lys Arg Arg
            20                  25                  30

Glu Glu Asp Glu Glu Arg Arg Arg Lys Glu Glu Glu Glu Arg Arg Met
        35                  40                  45

Lys Leu Glu Met Glu Ala Lys Arg Lys Gln Glu Glu Glu Glu Arg Lys
    50                  55                  60

Lys Arg Glu Asp Asp Glu Lys Arg Lys Lys Lys Lys Leu
65                  70                  75

<210> SEQ ID NO 6
<211> LENGTH: 1767
<212> TYPE: DNA
<213> ORGANISM: Artificial Sequence
<220> FEATURE:
<223> OTHER INFORMATION: Fusion Sequence coded Glucose dehydrogenase and
      Ketoreductase enzyme

<400> SEQUENCE: 6
```

| | | |
|---|---|---|
| atgtatatgt atccggattt aaaaggaaaa gtcgtcgcta ttacaggagc tgcttcaggg | 60 |
| ctcggaaagg cgatggccat tcgcttcggc aaggagcagg caaaagtggt tatcaactat | 120 |
| tatagtaata acaagatccc gaacgaggta aagaagagg tcatcaaggc gggcggtgaa | 180 |
| gctgttgtcg tccaaggaga gtcacgaaa gaggaagatg taaaaatat cgtgcaaacg | 240 |
| gcaattaagg agttcggcac actcgatatt atgattaata atgccggtct tgaaaatcct | 300 |
| gtgccatctc acgaaatgcc gctcaaggat tgggataaag tcatcggcac gaacttaacg | 360 |
| ggtgcctttt taggaagccg tgaagcgatt aaatatttcg tagaaaacga tattaaggga | 420 |
| aatgtcatta acatgtccag tgtgcacgaa gtgattcctt ggccgttatt tgtccactat | 480 |
| gcggcaagta aggcgggat aaagctgatg acagaaacat tagcgttgga atacgcgccg | 540 |
| aagggcattc gcgtcaataa tattgggcca ggtgcgatca acacgccaat caatgctgaa | 600 |
| aaattcgctg accctaaaca gaaagctgat gtagaaagca tgattccaat gggatatatc | 660 |
| ggcgaaccgg aggagatcgc cgcagtagca gcctggcttg cttcgaagga agccagctac | 720 |
| gtcacaggca tcacgttatt cgcggacggc ggtatgacac aatatccttc attccaggca | 780 |
| ggccgcggtg aattcgaaga gaggaaaaa agaaacagc aggaagaaga gcggaacgt | 840 |
| ctgcgtcgta ttcaggagga gatggagaaa gaacgtaaac gccgcgaaga ggacgaagaa | 900 |
| cgccgtcgta agaggaaga ggagcgccgt atgaaactgg aaatgaaagc gaaacgcaaa | 960 |
| caagaggagg aagagcgtaa aaagcgcgag gatgatgaaa acgtaagaa aaaaaagctt | 1020 |
| atgtcttcgc ctgctcccac cgtctacgtc atctctggcg cctctcgcgg catcggcttc | 1080 |
| gccatcacct ccattctcgc tcaacacgac aacgtattga tctttgccgg cgcacgcgac | 1140 |

```
ctcaagtcgg cgcaactgaa cgagctcgct cagaagtcta gcggcaaggt catcccggtc    1200
aagctcgagt cgacgagtgt cgaggatgcc gctgcgcttg ccaaggtcgt cgaggagaag    1260
gctggaaagg tggactacgt cttggccgtc gccggcatct cccagtcgac cgaccccatc    1320
gcccaagtct ccctcgacga cgtcaggcgt cacttcgagg tcaacaccat cggccctctc    1380
gtcctcttcc aggcgctcct cccctcacc accaagtcga ccgcgccgca cttcatcgtc     1440
gtctccacca tcgccggctc aatcgcctcc atgcctcaag tcgcgttccc cgtgagcgcc    1500
tacgctatct cgaagactgc cgtcaactcg gccgtaggac gaatcgcgat cgagcacccc    1560
gacctcgacg ccttcgtctg ccatccgggc tttgtgagca gcgacatggt caaacaattt    1620
gcggagaaga cgggcgcacc gttgtcggac tttgagtcgt ttggcatgat cacccccgaa    1680
gaatcggctg cgagtctcgt taagctgttc gacgaggcca agaaggagac gcactcgggc    1740 aagttctttta acgtcgacgg gacctag                                       1767
```

<210> SEQ ID NO 7
<211> LENGTH: 1779
<212> TYPE: DNA
<213> ORGANISM: Artificial Sequence
<220> FEATURE:
<223> OTHER INFORMATION: Fusion Sequence coding Ketoreductase enzyme and
  Glucose dehydrogenase

<400> SEQUENCE: 7

```
atgtcttcgc ctgctcccac cgtctacgtc atctctggcg cctctcgcgg catcggcttc      60
gccatcacct ccattctcgc tcaacacgac aacgtattga tctttgccgg cgcacgcgac     120
ctcaagtcgg cgcaactgaa cgagctcgct cagaagtcta gcggcaaggt catcccggtc     180
aagctcgagt cgacgagtgt cgaggatgcc gctgcgcttg ccaaggtcgt cgaggagaag     240
gctggaaagg tggactacgt cttggccgtc gccggcatct cccagtcgac cgaccccatc     300
gcccaagtct ccctcgacga cgtcaggcgt cacttcgagg tcaacaccat cggccctctc     360
gtcctcttcc aggcgctcct cccctcacc accaagtcga ccgcgccgca cttcatcgtc      420
gtctccacca tcgccggctc aatcgcctcc atgcctcaag tcgcgttccc cgtgagcgcc     480
tacgctatct cgaagactgc cgtcaactcg gccgtaggac gaatcgcgat cgagcacccc     540
gacctcgacg ccttcgtctg ccatccgggc tttgtgagca gcgacatggt caaacaattt     600
gcggagaaga cgggcgcacc gttgtcggac tttgagtcgt ttggcatgat cacccccgaa     660
gaatcggctg cgagtctcgt taagctgttc gacgaggcca agaaggagac gcactcgggc     720 aagttctttta acgtcgacgg gacctgaattc gaagaagagg aaaaaaagaa acagcaggaa    780
gaagaagcgg aacgtctgcg tcgtattcag gaggagatgg agaaagaacg taaacgccgc     840
gaagaggacg aagaacgccg tcgtaaagag gaagaggagc gccgtatgaa actggaaatg     900
gaagcgaaac gcaaacaaga ggaggaagag cgtaaaaagc gcgaggatga tgaaaaacgt     960
aagaaaaaaa agcttatgta tccggattta aaaggaaaag tcgtcgctat tacaggagct    1020
gcttcagggc tcggaaaggc gatggccatt cgcttcggca aggagcaggc aaaagtggtt    1080
atcaactatt atagtaataa acaagatccg aacgaggtaa agaagaggt catcaaggcg    1140 ggcggtgaag ctgttgtcgt ccaaggagat gtcacgaaag aggaagatgt aaaaaatatc   1200
gtgcaaacgg caattaagga gttcggcaca ctcgatatta tgattaataa tgccggtctt    1260
gaaaatcctg tgccatctca cgaaatgccg ctcaaggatt gggataaagt catcggcacg    1320
aacttaacgg gtgcctttttt aggaagccgt gaagcgatta atatttcgt agaaaacgat    1380
```

```
attaagggaa atgtcattaa catgtccagt gtgcacgaag tgattccttg gccgttattt    1440
gtccactatg cggcaagtaa aggcgggata aagctgatga cagaaacatt agcgttggaa    1500
tacgcgccga agggcattcg cgtcaataat attgggccag gtgcgatcaa cacgccaatc    1560
aatgctgaaa aattcgctga ccctaaacag aaagctgatg tagaaagcat gattccaatg    1620
ggatatatcg gcgaaccgga ggagatcgcc gcagtagcag cctggcttgc ttcgaaggaa    1680
gccagctacg tcacaggcat cacgttattc gcggacggcg gtatgacaca atatccttca    1740
ttccaggcag gccgcggtca ccaccaccac caccactag                           1779

<210> SEQ ID NO 8
<211> LENGTH: 588
<212> TYPE: PRT
<213> ORGANISM: Artificial Sequence
<220> FEATURE:
<223> OTHER INFORMATION: Fusion enzyme of Glucose dehydrogenase and
      Ketoreductase enzyme

<400> SEQUENCE: 8

Met Tyr Met Tyr Pro Asp Leu Lys Gly Lys Val Val Ala Ile Thr Gly
1               5                   10                  15

Ala Ala Ser Gly Leu Gly Lys Ala Met Ala Ile Arg Phe Gly Lys Glu
            20                  25                  30

Gln Ala Lys Val Val Ile Asn Tyr Tyr Ser Asn Lys Gln Asp Pro Asn
        35                  40                  45

Glu Val Lys Glu Glu Val Ile Lys Ala Gly Gly Glu Ala Val Val Val
    50                  55                  60

Gln Gly Asp Val Thr Lys Glu Glu Asp Val Lys Asn Ile Val Gln Thr
65                  70                  75                  80

Ala Ile Lys Glu Phe Gly Thr Leu Asp Ile Met Ile Asn Asn Ala Gly
                85                  90                  95

Leu Glu Asn Pro Val Pro Ser His Glu Met Pro Leu Lys Asp Trp Asp
            100                 105                 110

Lys Val Ile Gly Thr Asn Leu Thr Gly Ala Phe Leu Gly Ser Arg Glu
        115                 120                 125

Ala Ile Lys Tyr Phe Val Glu Asn Asp Ile Lys Gly Asn Val Ile Asn
    130                 135                 140

Met Ser Ser Val His Glu Val Ile Pro Trp Pro Leu Phe Val His Tyr
145                 150                 155                 160

Ala Ala Ser Lys Gly Gly Ile Lys Leu Met Thr Glu Thr Leu Ala Leu
                165                 170                 175

Glu Tyr Ala Pro Lys Gly Ile Arg Val Asn Asn Ile Gly Pro Gly Ala
            180                 185                 190

Ile Asn Thr Pro Ile Asn Ala Glu Lys Phe Ala Asp Pro Lys Gln Lys
        195                 200                 205

Ala Asp Val Glu Ser Met Ile Pro Met Gly Tyr Ile Gly Glu Pro Glu
    210                 215                 220

Glu Ile Ala Ala Val Ala Ala Trp Leu Ala Ser Lys Glu Ala Ser Tyr
225                 230                 235                 240

Val Thr Gly Ile Thr Leu Phe Ala Asp Gly Gly Met Thr Gln Tyr Pro
                245                 250                 255

Ser Phe Gln Ala Gly Arg Gly Glu Phe Glu Glu Glu Lys Lys Lys
            260                 265                 270

Gln Gln Glu Glu Glu Ala Glu Arg Leu Arg Arg Ile Gln Glu Glu Met
        275                 280                 285
```

```
Glu Lys Glu Arg Lys Arg Arg Glu Glu Asp Glu Glu Arg Arg Arg Lys
            290                 295                 300

Glu Glu Glu Glu Arg Arg Met Lys Leu Glu Met Glu Ala Lys Arg Lys
305                 310                 315                 320

Gln Glu Glu Glu Glu Arg Lys Lys Arg Glu Asp Asp Glu Lys Arg Lys
                325                 330                 335

Lys Lys Lys Leu Met Ser Ser Pro Ala Pro Thr Val Tyr Val Ile Ser
                340                 345                 350

Gly Ala Ser Arg Gly Ile Gly Phe Ala Ile Thr Ser Ile Leu Ala Gln
                355                 360                 365

His Asp Asn Val Leu Ile Phe Ala Gly Ala Arg Asp Leu Lys Ser Ala
            370                 375                 380

Gln Leu Asn Glu Leu Ala Gln Lys Ser Ser Gly Lys Val Ile Pro Val
385                 390                 395                 400

Lys Leu Glu Ser Thr Ser Val Glu Asp Ala Ala Leu Ala Lys Val
                405                 410                 415

Val Glu Glu Lys Ala Gly Lys Val Asp Tyr Val Leu Ala Val Ala Gly
                420                 425                 430

Ile Ser Gln Ser Thr Asp Pro Ile Ala Gln Val Ser Leu Asp Asp Val
            435                 440                 445

Arg Arg His Phe Glu Val Asn Thr Ile Gly Pro Leu Val Leu Phe Gln
        450                 455                 460

Ala Leu Leu Pro Leu Thr Thr Lys Ser Thr Ala Pro His Phe Ile Val
465                 470                 475                 480

Val Ser Thr Ile Ala Gly Ser Ile Ala Ser Met Pro Gln Val Thr Phe
                485                 490                 495

Pro Val Ser Ala Tyr Ala Ile Ser Lys Thr Ala Val Asn Ser Ala Val
                500                 505                 510

Gly Arg Ile Ala Ile Glu His Pro Asp Leu Asp Ala Phe Val Cys His
            515                 520                 525

Pro Gly Phe Val Ser Ser Asp Met Val Lys Gln Phe Ala Glu Lys Thr
        530                 535                 540

Gly Ala Pro Leu Ser Asp Phe Glu Ser Phe Gly Met Ile Thr Pro Glu
545                 550                 555                 560

Glu Ser Ala Ala Ser Leu Val Lys Leu Phe Asp Glu Ala Lys Lys Glu
                565                 570                 575

Thr His Ser Gly Lys Phe Phe Asn Val Asp Gly Thr
                580                 585

<210> SEQ ID NO 9
<211> LENGTH: 592
<212> TYPE: PRT
<213> ORGANISM: Artificial Sequence
<220> FEATURE:
<223> OTHER INFORMATION: Fusion enzyme of Ketoreductase enzyme and
      Glucose dehydrogenase

<400> SEQUENCE: 9

Met Ser Ser Pro Ala Pro Thr Val Tyr Val Ile Ser Gly Ala Ser Arg
1               5                   10                  15

Gly Ile Gly Phe Ala Ile Thr Ser Ile Leu Ala Gln His Asp Asn Val
                20                  25                  30

Leu Ile Phe Ala Gly Ala Arg Asp Leu Lys Ser Ala Gln Leu Asn Glu
            35                  40                  45

Leu Ala Gln Lys Ser Ser Gly Lys Val Ile Pro Val Lys Leu Glu Ser
        50                  55                  60
```

```
Thr Ser Val Glu Asp Ala Ala Leu Ala Lys Val Glu Glu Lys
65              70              75              80

Ala Gly Lys Val Asp Tyr Val Leu Ala Val Ala Gly Ile Ser Gln Ser
            85              90              95

Thr Asp Pro Ile Ala Gln Val Ser Leu Asp Asp Val Arg Arg His Phe
                100             105             110

Glu Val Asn Thr Ile Gly Pro Leu Val Leu Phe Gln Ala Leu Leu Pro
            115             120             125

Leu Thr Thr Lys Ser Thr Ala Pro His Phe Ile Val Val Ser Thr Ile
130             135             140

Ala Gly Ser Ile Ala Ser Met Pro Gln Val Thr Phe Pro Val Ser Ala
145             150             155             160

Tyr Ala Ile Ser Lys Thr Ala Val Asn Ser Ala Val Gly Arg Ile Ala
                165             170             175

Ile Glu His Pro Asp Leu Asp Ala Phe Val Cys His Pro Gly Phe Val
                180             185             190

Ser Ser Asp Met Val Lys Gln Phe Ala Glu Lys Thr Gly Ala Pro Leu
            195             200             205

Ser Asp Phe Glu Ser Phe Gly Met Ile Thr Pro Glu Glu Ser Ala Ala
210             215             220

Ser Leu Val Lys Leu Phe Asp Glu Ala Lys Lys Glu Thr His Ser Gly
225             230             235             240

Lys Phe Phe Asn Val Asp Gly Thr Glu Phe Glu Glu Glu Lys Lys
                245             250             255

Lys Gln Gln Glu Glu Ala Glu Arg Leu Arg Arg Ile Gln Glu Glu
            260             265             270

Met Glu Lys Glu Arg Lys Arg Glu Glu Asp Glu Glu Arg Arg Arg
            275             280             285

Lys Glu Glu Glu Glu Arg Arg Met Lys Leu Glu Met Glu Ala Lys Arg
290             295             300

Lys Gln Glu Glu Glu Glu Arg Lys Lys Arg Glu Asp Asp Glu Lys Arg
305             310             315             320

Lys Lys Lys Lys Leu Met Tyr Pro Asp Leu Lys Gly Lys Val Val Ala
                325             330             335

Ile Thr Gly Ala Ala Ser Gly Leu Gly Lys Ala Met Ala Ile Arg Phe
            340             345             350

Gly Lys Glu Gln Ala Lys Val Val Ile Asn Tyr Tyr Ser Asn Lys Gln
            355             360             365

Asp Pro Asn Glu Val Lys Glu Glu Val Ile Lys Ala Gly Gly Glu Ala
            370             375             380

Val Val Val Gln Gly Asp Val Thr Lys Glu Glu Asp Val Lys Asn Ile
385             390             395             400

Val Gln Thr Ala Ile Lys Glu Phe Gly Thr Leu Asp Ile Met Ile Asn
                405             410             415

Asn Ala Gly Leu Glu Asn Pro Val Pro Ser His Glu Met Pro Leu Lys
            420             425             430

Asp Trp Asp Lys Val Ile Gly Thr Asn Leu Thr Gly Ala Phe Leu Gly
            435             440             445

Ser Arg Glu Ala Ile Lys Tyr Phe Val Glu Asn Asp Ile Lys Gly Asn
            450             455             460

Val Ile Asn Met Ser Ser Val His Glu Val Ile Pro Trp Pro Leu Phe
465             470             475             480
```

```
Val His Tyr Ala Ala Ser Lys Gly Gly Ile Lys Leu Met Thr Glu Thr
                485                 490                 495

Leu Ala Leu Glu Tyr Ala Pro Lys Gly Ile Arg Val Asn Asn Ile Gly
            500                 505                 510

Pro Gly Ala Ile Asn Thr Pro Ile Asn Ala Glu Lys Phe Ala Asp Pro
            515                 520                 525

Lys Gln Lys Ala Asp Val Glu Ser Met Ile Pro Met Gly Tyr Ile Gly
        530                 535                 540

Glu Pro Glu Glu Ile Ala Ala Val Ala Ala Trp Leu Ala Ser Lys Glu
545                 550                 555                 560

Ala Ser Tyr Val Thr Gly Ile Thr Leu Phe Ala Asp Gly Gly Met Thr
                565                 570                 575

Gln Tyr Pro Ser Phe Gln Ala Gly Arg Gly His His His His His His
            580                 585                 590
```

USE OF BIOLOGICAL ENZYME FOR PREPARING ORLISTAT INTERMEDIATE, AND PREPARATION METHOD

RELATED APPLICATIONS

This is a national phase application of PCT/CN2021/070495 filed Jan. 6, 2021, which claims the benefit of CN202010015510.1 filed Jan. 7, 2020, each of which is incorporated herein by reference in its entirety.

SEQUENCE LISTING

The specification further incorporates by reference the Sequence Listing submitted herewith via EFS. The Sequence Listing text file, identified as Sequence Listing-EIC2021042001CN-US.txt, was created on Jan. 4, 2021 and then corrected on Aug. 18, 2023 to have the size of 25,773 bytes. The Sequence Listing, electronically filed herewith, does not extend beyond the scope of the specification filed Jul. 5, 2022 and thus does not give rise to new matter.

FIELD OF THE INVENTION

The present invention belongs to the technical field of biopharmacy and biochemical engineering, and particularly relates to a method for biosynthesis of (R)-β-hydroxytetradecanoate compounds.

BACKGROUND OF THE INVENTION

There are mainly two categories of drugs for treating obesity, that is antiobesity drugs acting on central nerves and antiobesity drugs without acting on the central nerves. The antiobesity drugs acting on the central nerves have obvious weight-reducing effect followed by large side effect and thus are largely limited in clinical application, wherein fenfluramine got off the market in 1997 due to the capability of causing pulmonary arterial hypertension and hypertrophic valve disorders; sibutramine was announced to stop production, sales and use by State Food and Drug Administration in 2010 due to the risk that serious cardiovascular diseases might be increased; and locaserin (trade name: Belviq) was approved for marketing by the FDA at June, 2012, still has the risk of increasing valvular diseases and adverse cardiovascular events and requires further verification in safety of clinical application.

Orlistat is a first antiobesity drug without acting on the central nerves and is an only one OTC antiobesity drug in the world at present. Since the orlistat came to the market in 1998, it has already become the first drug for treating the obesity due to obvious curative effect and high safety. Orlistat directly acts on gastrointestinal lipase, is significant in effect of inhibiting absorption of fats, is highly specific to a target, has no influence on other gastrointestinal enzymes, exerts the effect without systemic absorption, is very low in exposure amount of system drugs in a body, has the main side effect of gastrointestinal reactions and is excellent in safety. Orlistat has been sold for more than 20 years in the world, has been approved for marketing in more than 145 countries at present and has been verified by large clinical applications in excellent curative effect and safety.

The market demand on the orlistat is large, so that it is very important to find efficient synthetic methods for the orlistat and an intermediate thereof. (R)-β-hydroxytetradecanoate is an important intermediate for synthesizing the orlistat as a drug; and an optical purity of the intermediate is crucial. But how do we efficiently obtain optically pure (R)-β-hydroxytetradecanoate?

For example, Chinese Patent CN101538285B reported an asymmetric hydrogenation catalyzed by using a prepared (R)-metal catalyst [(R)-Ru (MeOBIPHEP)Cl2]2•NEt3; however, such chemical catalytic reaction requires to be conducted under the conditions with strong acid and high pressure of 60 bar only, and then a product with an ee value larger than 98.5% can be obtained. Such method has the deficiencies that: 1) an expensive (R)-ligand and noble metal catalyst are required; 2) the catalyst requires to be prepared while being used, and the process stability is difficultly guaranteed; 3) high-pressure hydrogenation equipment is required; 4) acid-resistant equipment is required; and 5) the ee value can be affected if the reaction is poorly controlled.

OBJECTS AND SUMMARY OF THE INVENTION

Aiming to the above disadvantages in the prior art, the inventor uses a biological enzyme method for an improvement on system and then solves the problem of scale production of key intermediates of orlistat.

In view of this, the first objective of the present invention is to provide a novel use of a biological enzyme for preparing an orlistat intermediate. The biological enzyme can effectively act on β-carbonyl tetradecanoate as a substrate, so as to prepare the orlistat intermediate with a high purity.

In order to achieve the above objective, the present invention provides the following technical solution:

a use of a biological enzyme for preparing an orlistat intermediate (final product) is provided. A substrate of the biological enzyme action is β-carbonyl tetradecanoate (raw material) with a structural formula shown as I; the orlistat intermediate is (R)-β-hydroxytetradecanoate with a structural formula shown as II; in the structural formula I, R refers to a saturated alkyl group having 1-3 carbon atoms; and in the structural formula II, R refers to a saturated alkyl group having 1-3 carbon atoms.

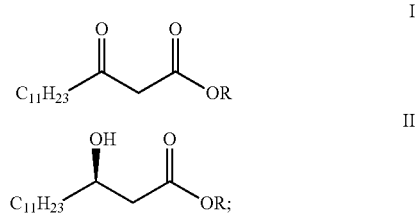

The biological enzyme is a ketoreductase having an amino acid sequence shown as SEQ ID NO: 1 and an amino acid sequence of 90% or more homology thereto, is from Singulisphaera acidiphila, is coded as WP_015245403.1 in an NCBI data bank and belongs to a short chain dehydrogenase family; and/or the biological enzyme has an amino acid sequence shown as SEQ ID NO: 2 and an amino acid sequence of 90% or more homology thereto, is from Sphingomonas echinoides, is coded as WP_010403640.1 in the NCBI data bank and belongs to a short chain dehydrogenase family; and/or the biological enzyme has an amino acid sequence shown as SEQ ID NO: 4 and an amino acid sequence of 80% or more identity thereto, is from Rhodotorula toruloides, is a kind of truncated proteins coded as EGU12837.1 protein in the NCBI data bank and belongs to a short chain dehydrogenase family. Or the biological enzyme is a fusion enzyme of the ketoreductase and a glucose dehydrogenase; and an amino acid sequence of the fusion enzyme is shown as SEQ ID NO: 8 and/or SEQ ID NO: 9. The inventor is surprised to find that a natural biological enzyme or a biological enzyme modified by gene/protein engineering has very good catalytic effect to the substrate, and a final product with high optical purity is obtained.

Further, the biological enzyme having the amino acid sequence of 90% or more identity/homology to SEQ ID NO: 1 and/or SEQ ID NO: 2, of 80% or more identity/homology to SEQ ID NO: 4 and having the amino acid sequence shown as SEQ ID NO: 8 and/or SEQ ID NO: 9 may further be applied to preparing the orlistat intermediate.

Further, in the fusion enzyme of the ketoreductase and the glucose dehydrogenase, the ketoreductase is linked to the glucose dehydrogenase through a linker.

Further, an amino acid sequence of the linker is shown as SEQ ID NO: 5.

Further, the fusion enzyme of the ketoreductase and the glucose dehydrogenase is ketoreductase-linker-glucose dehydrogenase or glucose dehydrogenase-linker-ketoreductase; and optionally, an amino acid sequence of the glucose dehydrogenase is shown as SEQ ID NO: 3.

Further, any of the forgoing biological enzymes is enzyme powder, an enzyme solution and/or an immobilized enzyme.

Further, in the structural formula I, R is any one of methyl, ethyl, n-propyl or isopropyl; and in the structural formula II, R is any one of the methyl, the ethyl, the n-propyl or the isopropyl.

The second objective of the present invention is to provide a fusion enzyme. The fusion enzyme is a fusion enzyme of the ketoreductase and the glucose dehydrogenase; and an amino acid sequence of the fusion enzyme is shown as SEQ ID NO: 8 and/or SEQ ID NO: 9.

Further, in the fusion enzyme, the ketoreductase is linked to the glucose dehydrogenase through a linker; and optionally, an amino acid sequence of the linker is shown as SEQ ID NO: 5.

Further, the fusion enzyme is the ketoreductase-linker-glucose dehydrogenase or the glucose dehydrogenase-linker-ketoreductase.

Optionally, an amino acid sequence of the ketoreductase is shown as SEQ ID NO: 1 and/or SEQ ID NO: 2 and/or SEQ ID NO: 4 and an amino acid sequence of 80% or more identity/homology thereto.

Optionally, an amino acid sequence of the glucose dehydrogenase is shown as SEQ ID NO: 3.

The third objective of the present invention is to provide a nucleotide sequence for coding the fusion enzyme and a method for constructing the nucleotide sequence.

A nucleotide sequence of the fusion enzyme is shown as SEQ ID NO: 6 or SEQ ID NO: 7.

Further, the method for constructing the nucleotide sequence comprises the steps of: inserting a linker sequence shown as SEQ ID NO: 5 into 3' end of a gene fragment of the glucose dehydrogenase shown as SEQ ID NO: 3, and linking a gene fragment of the ketoreductase shown as SEQ ID NO: 4 behind the linker sequence to form a recombinant plasmid having a nucleotide sequence shown as SEQ ID NO: 6.

Further, the nucleotide sequence (SEQ ID NO: 6) of the fusion enzyme is linked to a vector pET28a at digestion sites NdeI and XhoI at two ends to form a double-enzyme fusion expression plasmid pET28a-G3790, and the double-enzyme fusion expression plasmid pET28a-G3790 is transformed to *Escherichia coli* for screening, inoculation and culture to obtain thalli; and the thalli are crushed and centrifuged to obtain a crude enzyme solution, and the crude enzyme solution is freeze-dried to obtain enzyme powder.

Further, the method for constructing the nucleotide sequence comprises the steps of: inserting a linker sequence shown as SEQ ID NO: 5 into 3' end of a gene fragment of the ketoreductase shown as SEQ ID NO: 4, and linking a gene fragment of the glucose dehydrogenase shown as SEQ ID NO: 3 behind the linker sequence to form a nucleotide sequence shown as SEQ ID NO: 7.

Further, the nucleotide sequence (SEQ ID NO: 7) of the fusion enzyme is linked to a vector pET28a at digestion sites NdeI and XhoI at two ends to form a double-enzyme fusion expression plasmid pET28a-G3790, and the double-enzyme fusion expression plasmid pET28a-G3790 is transformed to *Escherichia coli* for screening, inoculation and culture to obtain thalli; and the thalli is crushed and centrifuged to obtain a crude enzyme solution, and the crude enzyme solution is freeze-dried to obtain enzyme powder.

The fourth objective of the present invention is to provide a composition. In the composition, two can form a synergic relationship of the enzyme and the substrate, and a product with a structural formula shown as II is obtained.

In order to achieve the above objective, the present invention provides the following technical solution:
provided is the composition containing any one of the biological enzymes and the substrate, wherein the substrate is β-carbonyl tetradecanoate. the β-carbonyl tetradecanoate has the structural formula shown as I; the biological enzyme is the ketoreductase or the fusion enzyme of the ketoreductase and the glucose dehydrogenase; the amino acid sequence of the ketoreductase is shown as SEQ ID NO: 1 and/or SEQ ID NO: 2 and/or SEQ ID NO: 4 and an amino acid sequence of 80% or more identity/homology thereto; the amino acid sequence of the fusion enzyme is shown as SEQ ID NO: 8 and/or SEQ ID NO: 9;

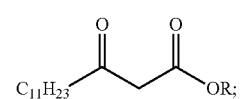

I and
in the structural formula I, R refers to a saturated alkyl group having 1-3 carbon atoms.

Further, in the fusion enzyme, the ketoreductase is linked to the glucose dehydrogenase through a linker; and optionally, an amino acid sequence of the linker is shown as SEQ ID NO: 5.

Further, the fusion enzyme is the ketoreductase-linker-glucose dehydrogenase or the glucose dehydrogenase-linker-ketoreductase.

Further, the amino acid sequence of the glucose dehydrogenase is shown as SEQ ID NO: 3.

Further, the biological enzyme is enzyme powder, an enzyme solution and/or an immobilized enzyme.

Further, in the structural formula I, R is any one of methyl, ethyl, n-propyl or isopropyl; and in the structural formula II, R is any one of the methyl, the ethyl, the n-propyl or the isopropyl.

Further, in the composition, wherein a weight ratio of the biological enzyme to the substrate is 1:(1.1-150).

Preferably, in the composition, the weight ratio of the biological enzyme to the substrate is one of 1:20, 1:30, 1:40, 1:50, 1:60, 1:70, 1:80, 1:90, 1:100, 1:110, 1:120, 1:130, 1:140 and 1:150.

The fifth objective of the present invention is to provide a reaction system for preparing (R)-β-hydroxytetradecanoate. By using the reaction system, the (R)-β-hydroxytetradecanoate may be obtained without stringent conditions of a high temperature and a high pressure.

In order to achieve the above objective, the present invention provides the following technical solution:

the reaction system comprises a substrate shown as I, a biological enzyme, glucose, a glucose dehydrogenase, NADP+ and a buffer solution; and here, the biological enzyme is a ketoreductase having an amino acid sequence shown as SEQ ID NO: 1 and/or SEQ ID NO: 2 and/or SEQ ID NO: 4 and an amino acid sequence of 80% or more identity/homology thereto. Or the reaction system comprises the substrate shown as I, the biological enzyme, the glucose, NADP+ and the buffer solution; here, the biological enzyme is a fusion enzyme of the ketoreductase and the glucose dehydrogenase; an amino acid sequence of the ketoreductase is shown as SEQ ID NO: 1 and/or SEQ ID NO: 2 and/or SEQ ID NO: 4 and an amino acid sequence of 80% or more identity/homology thereto; and an amino acid sequence of the fusion enzyme of the ketoreductase and the glucose dehydrogenase is shown as SEQ ID NO: 8 and/or SEQ ID NO: 9.

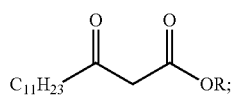

and in the structural formula I, R refers to a saturated alkyl group having 1-3 carbon atoms.

Further, the amino acid sequence of the glucose dehydrogenase is shown as SEQ ID NO: 3. Further, in the fusion enzyme, the ketoreductase is linked to the glucose dehydrogenase through a linker; and optionally, an amino acid sequence of the linker is shown as SEQ ID NO: 5.

Further, the fusion enzyme is the ketoreductase-linker-glucose dehydrogenase or the glucose dehydrogenase-linker-ketoreductase.

Further, the amino acid sequence of the glucose dehydrogenase is shown as SEQ ID NO: 3.

Further, the biological enzyme is enzyme powder, an enzyme solution and/or an immobilized enzyme.

Further, in the structural formula I, R is any one of methyl, ethyl, n-propyl or isopropyl; and in the structural formula II, R is any one of the methyl, the ethyl, the n-propyl or the isopropyl.

Further, a pH value of the reaction system is 6.0-8.0.

Further, in the reaction system, the buffer solution is a PBS buffer solution or a Tris-HCl buffer solution.

Further, in the reaction system, a concentration of the substrate is 20-150 g/L.

Further, the reaction system is characterized in that a concentration of NADP+ is 0.1-0.5 g/L.

Further, in the reaction system, a molar ratio of a compound I to the glucose is 1:(1.2-4).

Further, in the reaction system, a concentration of the buffer solution is 0.01-0.5 mol/L.

Further, in the reaction system, the reaction time does not exceed 15 h, and a reaction liquid is obtained.

The sixth objective of the present invention is to provide a method of preparing the orlistat intermediate. The method is suitable for industrial scale production.

A reaction formula of a method for biosynthesis of (R)-(β-hydroxytetradecanoate compounds is as follows:

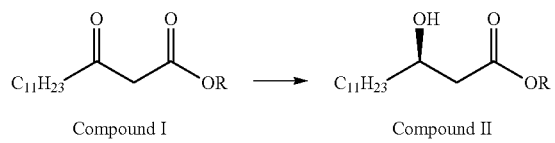

Compound I    Compound II

In the compound I and the compound II, R refers to a saturated alkyl group having 1-3 carbon atoms; and preferably, R is any one of the methyl, the ethyl, the n-propyl or the isopropyl.

The biosynthesis method comprises the steps of: reacting the compound I in the ketoreductase, the glucose, the glucose dehydrogenase and NADP+ or in the fusion enzyme of the ketoreductase and the glucose dehydrogenase, the glucose and NADP+ to obtain the compound II.

In an implementation solution of the present invention, the biosynthesis method comprises the following steps of: putting the compound I in the buffer solution, and then adding the ketoreductase, or the fusion enzyme of the ketoreductase and the glucose dehydrogenase, the glucose, the glucose dehydrogenase (the glucose dehydrogenase does not require to be added while the fusion enzyme of the ketoreductase and the glucose dehydrogenase is added) and NADP+ to a mixture to obtain a mixed solution; stirring the mixed solution at 20-40° C. for reaction, adjusting a pH value by a NaOH aqueous solution in the whole process, and monitoring a conversion rate of reaction by using liquid chromatography, and ending the reaction until the conversion rate reaches 99% or above; adding an extracting solvent for extraction; combining organic phases, conducting concentration under reduced pressure, cooling and crystallization, and precipitating a product to obtain a white solid which is the compound II; and optionally, further conducting recrystallization with normal hexane to obtain a product with a higher purity.

In some implementation solutions of the present invention, a concentration of the NaOH aqueous solution may be 2 M.

In some implementation solutions of the present invention, a pH value of the buffer solution is 6.0-8.0; preferably, the buffer solution is a PBS (i.e., phosphate) buffer solution or a Tris-HCl buffer solution; more preferably, the buffer solution is 0.01-0.5 mol/L PBS phosphate buffer solution or 0.01-0.5 mol/L Tris-HCl buffer solution.

In an implementation solution of the present invention, in the reaction process, a pH value range is controlled at 7.0-7.5.

In an implementation solution of the present invention, the amino acid sequence of the ketoreductase is shown as SEQ ID NO: 1, SEQ ID NO: 2 and SEQ ID NO: 4 of this application; the amino acid sequence of the fusion enzyme of the ketoreductase and the glucose dehydrogenase is shown as SEQ ID NO: 8 and/or SEQ ID NO: 9; the ketoreductase or the fusion enzyme of the ketoreductase and the glucose dehydrogenase may be in a form of the enzyme powder, the enzyme solution or the immobilized enzyme; and the amino acid sequence of the glucose dehydrogenase is shown as SEQ ID NO: 3, and the glucose dehydrogenase may be in a form of the enzyme powder, the enzyme solution or the immobilized enzyme.

In an implementation solution of the present invention, $NADP^+$ refers to nicotinamide adenine dinucleotide phosphate which is an oxidized form of reduced coenzyme II (NADPH); and in the mixed solution, the concentration of $NADP^+$ is 0.1-0.5 g/L.

In an implementation solution of the present invention, the concentration of the compound I in the mixed solution is 20-150 g/L.

In an implementation solution of the present invention, a molar ratio of the compound I to the glucose in the mixed solution is 1:(1.2-4).

In some implementation solutions of the present invention, preferably, a temperature of the reaction is kept at 35° C.

In some implementation solutions of the present invention, the extracting solution is used for extraction twice and is anhydrous ethanol or ethyl acetate.

The technical solution of the above contents are summarized, specifically:

the method for preparing the orlistat intermediate based on the reaction system comprises the steps of: stirring the reaction system at 20-40° C. for reaction to obtain a reaction liquid of the orlistat intermediate, wherein an intermediate of the orlistat intermediate is the (R)-β-hydroxytetradecanoate with the structural formula shown as II;

Further, in the method, the NaOH aqueous solution is used as a pH regulator.

Further, in the method, the reaction time does not exceed 15 h.

Further, in the method, a solvent is used in the reaction liquid to extract the orlistat intermediate.

Further, in the method, the solvent is the anhydrous ethanol or the ethyl acetate.

Further, in the method, an obtained extract is concentrated under reduced pressure, cooled and crystallized, and a white crystalline solid, which is the compound II, is obtained.

Provided is orlistat prepared with the orlistat intermediate.

and a chiral ee value may reach up 99% or above; the reaction may be fully completed within 15 h, and the concentration of the product is high; and nearly full conversion of the substrate may simplify the aftertreatment step of the reaction liquid, and the high-purity product may be obtained only requiring simple extraction and crystallization steps, so that the production cost is greatly lowered.

DETAILED DESCRIPTION OF THE EMBODIMENTS

Figure 1:
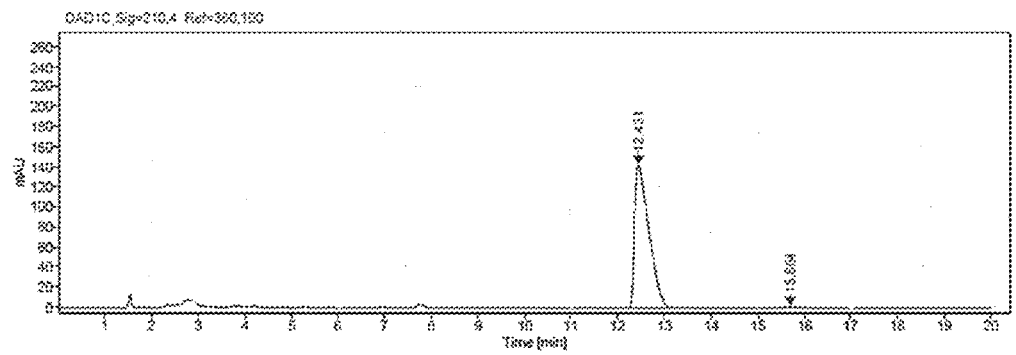
FIG. 1 is an HPLC chromatogram of a measured conversion rate according to Embodiment 5.

Listed embodiments are for better describing the present invention, but are not regarded as limitations for the contents of the present invention. So, nonessential improvements and adjustments made on the embodiments by those familiar with the art according to the above contents of the present invention should still fall within the protection scope of the present invention.

The present invention relates to that β-carbonyl tetradecanoate is reduced to (R)-β-hydroxytetradecanoate under the catalysis of the biological enzyme. A reaction formula is as follows:

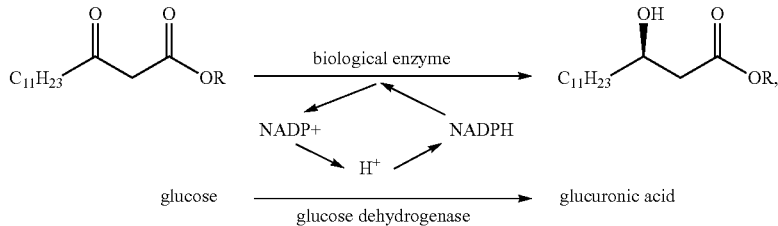

The Beneficial Effects Resulting from the Present Invention:

The biological enzyme used in the present invention may tolerate the concentration of the substrate reaching up to 150 g/L, and the activity of the enzyme is not limited by the substrate or the product.

A method for preparing the orlistat intermediate of the present invention is a biological enzyme method having mild conditions, conventional equipment and simple operations; and by using the method, the quantity of produced three wastes is small, no heavy metal pollution is caused, the environment is protected, and industrial production is facilitated.

By using the enzyme catalyzing process of the present invention, the conversion rate reaches up to 99% or above, β-carbonyl tetradecanoate, used as the substrate, is catalyzed by a certain enzyme in an environment containing a $NADP^+$ coenzyme, glucose and a glucose dehydrogenase to obtain (R)-β-hydroxytetradecanoate with a very high chiral purity, wherein a catalyzing enzyme generally belongs to a short chain dehydrogenase family and may further be a fusion enzyme of different enzymes, for example, a fusion enzyme of reductase and the glucose dehydrogenase in some embodiments of the present invention; and wherein the glucose is dehydrogenized under the effect of the glucose dehydrogenase to obtain $H^+$, and then the $NADP^+$ coenzyme carries $H^+$ to participate to reduction reaction of the β-carbonyl tetradecanoate to obtain β-hydroxytetradecanoate.

A ketoreductase JR3789 of the present invention is from Singulisphaera acidiphila, is coded as WP_015245403.1 in an NCBI data bank, belongs to the short chain dehydrogenase family and has an amino acid sequence shown as SEQ ID NO: 1 in a size of 249 amino acids.

The amino acid sequence SEQ ID NO: 1 is shown as follows:

"MGKLDNKVAVITGGNSGMGLATAQRFVSEGAYVFITGRRQAELDKAVDL

IGKNVTGVQGDVSNLADLDRLYATVKEQKGRVDVLFANAGVGELAPLGSI

TEEQFDKVFNINVRGLLFTVQKALPLFQDGGSIILNASIASIKGMPAFSV

YSASKAAVRSFARSWTVDLKGRKIRINTLSPGPIDTPILSGLASTEEELK

QVKADLAAQVPLGRMGTSDEIANVALFLASDDSSYVTGIELFVDGGMAQ

I".

A ketoreductase JR37150 of the present invention is from Sphingomonas echinoides, is coded as WP_010403640.1 in the NCBI data bank, belongs to the short chain dehydrogenase family and has an amino acid sequence shown as SEQ ID NO: 2 in a size of 259 amino acids.

The amino acid sequence SEQ ID NO: 2 is shown as follows:

"MARLAGKVALVTGGASVPGLGSATAIRFAQEGATVYLTDRDLAGAQAVA

AQITAAGGRATALEHDVTSEADWDRVLAAIDAAEGRLDILVNNAGIAVLG

PLEDVTAADFLRQNDVNLNSVFHGSKRALVMMRRPGDGGTARGGSIINIS

SVAGLIGVPGCGSYAASKGGVRLFSKVVALEGAADGVRCNSVHPGMIATN

IQGVALEDNAANFDAVMALIPMVRMGEPEDIANMNLFLASDESRYITGAE

FVVDGGMTAR".

The glucose dehydrogenase (GDH) of the present invention is from Bacillus subtilis QB928, is coded as AFQ56330.1 in the NCBI data bank, belongs to the short chain dehydrogenase family and has an amino acid sequence shown as SEQ ID NO: 3 in a size of 263 amino acids.

The amino acid sequence SEQ ID NO: 3 is shown as follows:

"MYMYPDLKGKVVAITGAASGLGKAMAIRFGKEQAKVVINYYSNKQDPNE

VKEEVIKAGGEAVVVQGDVTKEEDVKNIVQTAIKEFGTLDIMINNAGLEN

PVPSHEMPLKDWDKVIGTNLTGAFLGSREAIKYFVENDIKGNVINMSSVH

EVIPWPLFVHYAASKGGIKLMTETLALEYAPKGIRVNNIGPGAINTPINA

EKFADPKQKADVESMIPMGYIGEPEEIAAVAAWLASKEASYVTGITLFAD

GGMTQYPSFQAGRG".

A ketoreductase JR3790 of the present invention is from Rhodotorula toruloides, is a kind of truncated proteins (of 70-371 bits) coded as EGU12837.1 protein in the NCBI data bank, belongs to the short chain dehydrogenase family and has an amino acid sequence shown as SEQ ID NO: 4 in a size of 248 amino acids.

The amino acid sequence SEQ ID NO: 4 is shown as follows:

"MSSPAPTVYVISGASRGIGFAITSILAQHDNVLIFAGARDLKSAQLNEL

AQKSSGKVIPVKLESTSVEDAAALAKVVEEKAGKVDYVLAVAGISQSTDP

IAQVSLDDVRRHFEVNTIGPLVLFQALLPLTTKSTAPHFIVVSTIAGSIA

SMPQVTFPVSAYAISKTAVNSAVGRIAIEHPDLDAFVCHPGFVSSDMVKQ

FAEKTGAPLSDFESFGMITPEESAASLVKLFDEAKKETHSGKFFNVDG

T".

A sequence of the linker is shown as SEQ ID NO: 5:

"EFEEEEKKKQQEEEAERLRRIQEEMEKERKRREEDEERRRKEEEERRMK

LEMEAKRKQEEEERKKREDDEKRKKKKL".

HPLC detection conditions: OD-H chromatographic column; a mobile phase is normal hexane: isopropanol=98:2; a flow rate is 1.0 mL/min. A detection instrument has a specification as follows: DAD1C, Sig=210,4 Ref=360,100.

The biological enzymes (SEQ ID NO: 1, SEQ ID NO: 2) and the glucose dehydrogenase (SEQ ID NO: 3) are all synthesized by Nanjing GenScript Biotech Corporation and are commercialized.

Example 1

1 g of β-carbonyl methyl tetradecanoate and 1.5 g of glucose were weighed and put in a 100 mL three-necked flask, and then 50 mL of a PBS buffer solution with a concentration of 50 mM and a pH value of 7.0 were added; the three-necked flask was put into a thermostat water bath, a stirring speed was adjusted to 800 rpm, and a temperature was adjusted to 35° C.; then 10 mg of NADP$^+$, 25 mg of glucose dehydrogenase (GDH) powder (shown as SEQ ID NO: 3) and 100 mg of ketoreductase JR3789 powder (shown as SEQ ID NO: 1) were added to obtain a mixed reaction liquid; a pH value was maintained at 7.0-7.5 by using a NaOH solution with a concentration of 2 M; the temperature was maintained at 35° C.; the reaction process was monitored by HPLC; the reaction ended after 9 h; and a conversion rate was measured to be larger than 99%.

After reaction was completed, the temperature was raised to 60° C. firstly, kept for 15 min and then cooled to 20-25° C.; 80 mL of ethyl acetate was added for extraction and stirring for 20 min; filtering was conducted; and a filtrate was layered to take an organic phase. An aqueous phase was extracted once by using 50 mL of ethyl acetate again, and layering was conducted to take an organic phase. The organic phases were combined; a product was concentrated under reduced pressure and then was slowly cooled; and a product was precipitated to obtain a crude product with a purity of 98.10% and an optical purity of 98.45%. 2 times normal hexane by volume was added to the crude product for dissolution with heating; a product was cooled and crystallized; crystals were collected and dried at a room temperature; 0.89 g of white crystal product was collected and measured to have a purity of 99.99%, an ee value of 99.91% and a total yield of 89%.

Example 2

1 g of β-carbonyl ethyl tetradecanoate and 1.5 g of glucose were weighed and put in a 100 mL three-necked flask, and then 50 mL of a PBS buffer solution with a concentration of 50 mM and a pH value of 7.0 were added; the three-necked flask was put into a thermostat water bath, a stirring speed was adjusted to 900 rpm, and a temperature was adjusted to 35° C.; then 10 mg of NADP+, 35 mg of glucose dehydrogenase (GDH) powder (shown as SEQ ID NO: 3) and 150 mg of ketoreductase JR3789 powder (shown as SEQ ID NO: 1) were added to obtain a mixed reaction liquid; a pH value was maintained at 7.0-7.5 by using a NaOH solution with a concentration of 2 M; the temperature was maintained at 35° C.; the reaction process was monitored by HPLC; the reaction ended after 10 h; and a conversion rate was measured to be larger than 99%.

After reaction was completed, the temperature was raised to 60° C. firstly, kept for 15 min and then cooled to 20-25° C.; 80 mL of ethyl acetate was added for extraction and stirring for 20 min; filtering was conducted; and a filtrate was layered to take an organic phase. An aqueous phase was extracted once by using 50 mL of ethyl acetate again, and layering was conducted to take an organic phase. The organic phases were combined; a product was concentrated under reduced pressure and then was slowly cooled; and a product was precipitated to obtain 0.84 g of white product with a purity of 98.42%, an ee value of 98.15% and a total yield of 84%.

Example 3

5 g of β-carbonyl methyl tetradecanoate and 7.5 g of glucose were weighed and put in a 100 mL three-necked flask, and then 50 mL of a PBS buffer solution with a concentration of 50 mM and a pH value of 7.0 were added; the three-necked flask was put into a thermostat water bath, a stirring speed was adjusted to 800 rpm, and a temperature was adjusted to 35° C.; then 50 mg of NADP+, 125 mg of glucose dehydrogenase (GDH) powder (shown as SEQ ID NO: 3) and 500 mg of ketoreductase JR3789 powder (shown as SEQ ID NO: 1) were added to obtain a mixed reaction liquid; a pH value was maintained at 7.0-7.5 by using a NaOH solution with a concentration of 2 M; the temperature was maintained at 35° C.; the reaction process was monitored by HPLC; the reaction ended after 13 h; and a conversion rate was measured to be larger than 99%.

After reaction was completed, the temperature was raised to 60° C. firstly, kept for 15 min and then cooled to 20-25° C.; 80 mL of ethyl acetate was added for extraction and stirring for 20 min; filtering was conducted; and a filtrate was layered to take an organic phase. An aqueous phase was extracted once by using 50 mL of ethyl acetate again, and layering was conducted to take an organic phase. The organic phases were combined; a product was concentrated under reduced pressure and then was slowly cooled; and a product was precipitated to obtain 4.65 g of white product with a purity of 98.12%, an ee value of 98.45% and a total yield of 93%.

Example 4

5 g of β-carbonyl methyl tetradecanoate and 7.5 g of glucose were weighed and put in a 100 mL three-necked flask, and then 50 mL of a PBS buffer solution with a concentration of 50 mM and a pH value of 7.0 were added; the three-necked flask was put into a thermostat water bath, a stirring speed was adjusted to 800 rpm, and a temperature was adjusted to 35° C.; then 50 mg of NADP+, 300 mg of glucose dehydrogenase (GDH) powder (shown as SEQ ID NO: 3) and 800 mg of ketoreductase JR37150 powder (shown as SEQ ID NO: 2) were added to obtain a mixed reaction liquid; a pH value was maintained at 7.0-7.5 by using a NaOH solution with a concentration of 2 M; the temperature was maintained at 35° C.; the reaction process was monitored by HPLC; the reaction ended after 35 h; and a conversion rate was measured to be larger than 99%.

After reaction was completed, the temperature was raised to 60° C. firstly, kept for 15 min and then cooled to 20-25° C.; 100 mL of ethyl acetate was added for extraction and stirring for 20 min; filtering was conducted; and a filtrate was layered to take an organic phase. An aqueous phase was extracted once by using 60 mL of ethyl acetate again, and layering was conducted to take an organic phase. The organic phases were combined; a product was concentrated under reduced pressure and then was slowly cooled; and a product was precipitated to obtain 4.55 g of white product with a purity of 98.62%, an optical purity of 99.66% and a total yield of 91%.

Example 5

7.5 g of β-carbonyl methyl tetradecanoate and 11.25 g of glucose were weighed and put in a 100 mL three-necked flask, and then 50 mL of a PBS buffer solution with a concentration of 50 mM and a pH value of 7.0 were added; the three-necked flask was put into a thermostat water bath, a stirring speed was adjusted to 800 rpm, and a temperature was adjusted to 35° C.; then 150 mg of NADP+, 200 mg of glucose dehydrogenase (GDH) powder (shown as SEQ ID NO: 3) and 750 mg of ketoreductase JR3789 powder (shown as SEQ ID NO: 1) were added to obtain a mixed reaction liquid; a pH value was maintained at 7.0-7.5 by using a NaOH solution with a concentration of 2 M; the temperature was maintained at 35° C.; the reaction process was monitored by HPLC; the reaction ended after 15 h; and a conversion rate was measured to be larger than 99%. Detection results are shown in Table 1, and an HPLC chromatogram was shown as FIG. 1.

Figure 2:
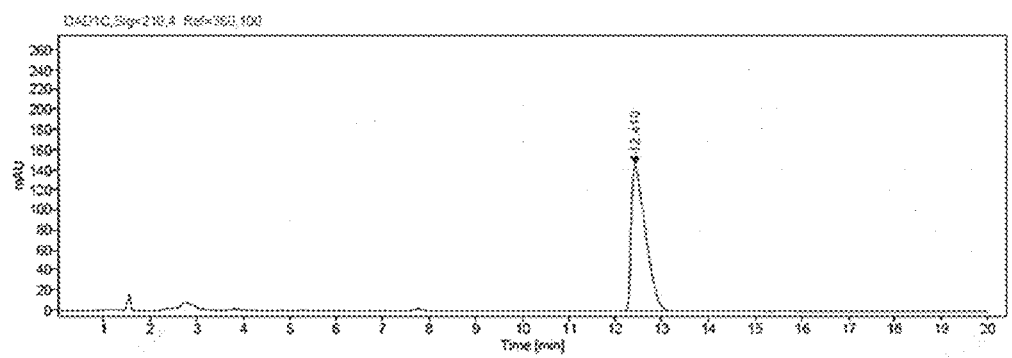
FIG. 2 is an HPLC chromatogram of a purity of a product according to Embodiment 5.
Figure 3:
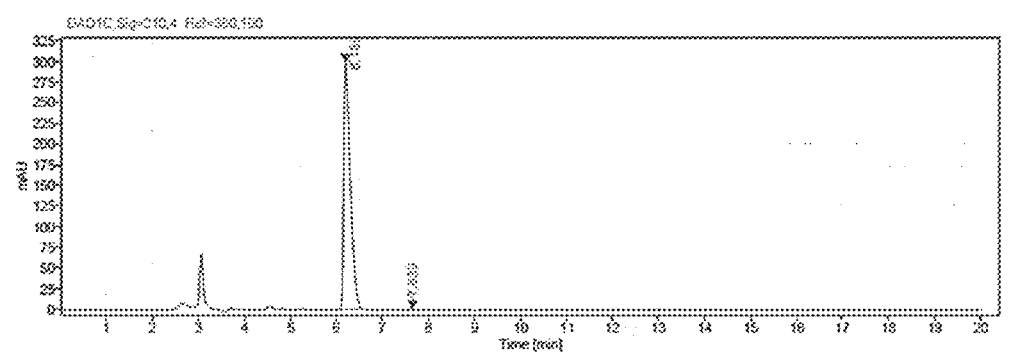
FIG. 3 is an HPLC chromatogram of a chiral purity of a product according to Embodiment 5.

After reaction was completed, the temperature was raised to 60° C. firstly, kept for 15 min and then cooled to 20-25° C.; 100 mL of ethyl acetate was added for extraction and stirring for 20 min; filtering was conducted; and a filtrate was layered to take an organic phase. An aqueous phase was extracted once by using 80 mL of ethyl acetate again, and layering was conducted to take an organic phase. The organic phases were combined; a product was concentrated under reduced pressure and then was slowly cooled; and a product was precipitated to obtain a crude product with a purity of 99.60% and an ee value of 98.68%. 2 times normal hexane by volume was added to the crude product for dissolution with heating; a product was crystallized with cooling; crystals were filtered and dried at a room temperature; 6.53 g of white crystal product was collected and measured to have a purity of 99.99%, an ee value of 99.86% and a total yield of 87%. Detected data of purities of the product is shown in Table 2, and an HPLC chromatogram was shown as FIG. 2; and data of chiral purities of the product is shown in Table 3, and an HPLC chromatogram was shown as FIG. 3.

TABLE 1

| Data table for measured conversion rates | | | | | |
| --- | --- | --- | --- | --- | --- |
| RT (min) | Type | Width (min) | Area | Height | Area |
| 12.431 | BB | 1.86 | 3001.36 | 142.52 | 99.06 |
| 15.684 | BBA | 0.79 | 28.40 | 1.48 | 0.94 |
| | | Sum | 3029.76 | | |

TABLE 2

Data table for measured purities of product

| RT (min) | Type | Width (min) | Area | Height | Area |
|---|---|---|---|---|---|
| 12.410 | BB | 1.36 | 3062.49 | 145.21 | 100.00 |
| | | Sum | 3062.49 | | |

TABLE 3

Data table for measured chiral purities of product

| RT (min) | Type | Width (min) | Area | Height | Area |
|---|---|---|---|---|---|
| 6.189 | BBA | 0.52 | 2944.36 | 298.07 | 99.93 |
| 7.639 | BB | 0.30 | 2.00 | 0.23 | 0.07 |
| | | Sum | 2946.336 | | |

Example 6

(1) Construction of Expression Plasmid for Fusion Enzyme G3790

Figure 4:
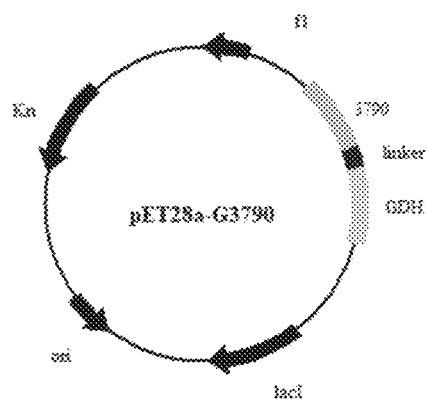
FIG. 4 is a plasmid map of an expression plasmid for a fusion enzyme G3790.

A gene sequence of a linker (SEQ ID NO: 5) was inserted into 3' end of a gene fragment of glucose dehydrogenase (SEQ ID NO: 3), then a gene fragment of a ketoreductase JR3790 (SEQ ID NO: 4) was linked behind the gene sequence of the linker to form a sequence (SEQ ID NO: 6) of a fusion enzyme G3790 (synthesized by Nanjing GenScript Biotech Corporation), and the sequence was linked to a vector pET28a at digestion sites NdeI and XhoI at two ends to form a double-enzyme fusion expression plasmid pET28a-G3790, wherein a plasmid map of a recombinant plasmid is shown as FIG. 4.

(2) Construction of Expression Plasmid for Fusion Enzyme 3790G

Figure 5:
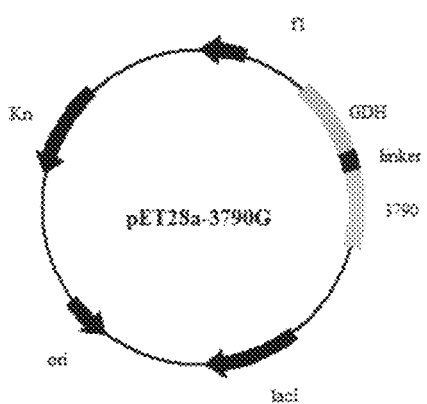
FIG. 5 is a plasmid map of an expression plasmid for a fusion enzyme 3790G.

A gene sequence of a linker (SEQ ID NO: 5) was inserted into 3' end of a gene fragment of a ketoreductase JR3790 (SEQ ID NO: 4), then a gene fragment of the glucose dehydrogenase (GDH) (SEQ ID NO: 3) was linked behind the gene sequence of the linker to form a sequence (SEQ ID NO: 7) of a fusion enzyme (synthesized by Nanjing GenScript Biotech Corporation), and the sequence was linked to a vector pET28a at the digestion sites NdeI and XhoI at two ends to form a double-enzyme fusion expression plasmid pET28a-3790G, wherein a plasmid map of a recombinant plasmid is shown as FIG. 5.

(3) Preparation of Fusion Enzyme G3790 and Fusion Enzyme 3790G

The constructed fusion enzyme expression plasmids pET28a-G3790 and pET28a-3790G were transformed to competent *E. coli* BL21(DE3) strains of *Escherichia coli*; the strains were screened to obtain positive cloned transformants; monoclones containing the recombinant plasmids were selected to be inoculated to test tubes containing 5 mL of LB culture medium (100 μg/ml kanamycin) for culture at 37° C. and 200 rpm overnight; bacterial solutions with an inoculability quantity of 2% were transferred into triangular shake flasks containing 1 L of LB culture medium for culture at 37° C. and 200 rpm until OD600 reached about 0.6; isopropanol-β-D-thiogalactoside (IPTG) inducers (with a final concentration of 0.3 mM) were added for continuous culture for 12 h at 25° C.; and products were centrifuged, and thalli were collected. The thalli were resuspended after being diluted with PBS (pH=7.0), then subjected to ultrasonication and centrifuged to obtain supernates which was crude enzyme solutions.

Figure 6:
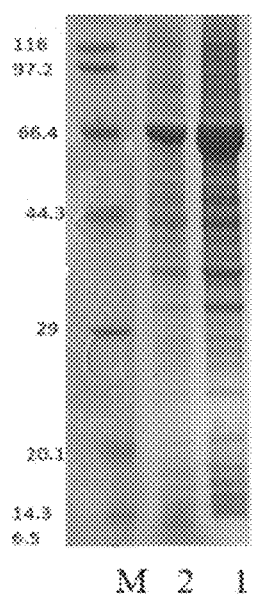
FIG. 6 is a diagram showing protein bands of a fusion enzyme G3790.
Figure 7:
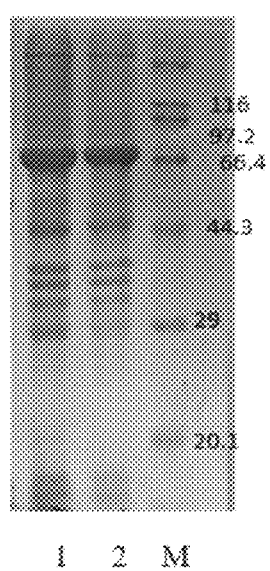
FIG. 7 is a diagram showing protein bands of a fusion enzyme 3790G.

The crude enzyme solutions obtained by expression were subjected to protein band identification with SDS-polyacrylamide gel electrophoresis (SDS-PAGE). FIG. 6 shows a protein electrophoretogram for a G3790 fusion enzyme, wherein a lane M is protein Marker (GenScript); a lane 1 is total proteins after whole cell disruption; and a lane 2 is a supernate obtained after whole cell disruption and centrifugation; and wherein the fusion enzyme should have a theoretical molecular weight of 67 kDa and an amino acid sequence shown as SEQ ID NO: 8. FIG. 7 shows a protein electrophoretogram for a 3790G fusion enzyme, wherein a lane M is protein Marker (GenScript); a lane 1 is total proteins after whole cell disruption; and a lane 2 is a supernate obtained after whole cell disruption and centrifugation; and wherein both the fusion enzymes should have a theoretical molecular weight of 67 kDa and an amino acid sequence shown as SEQ ID NO: 9. The two fusion enzymes are both soluble proteins and have molecular weights approaching the corresponding theoretical molecular weights.

The crude enzyme solutions were prefreezed overnight and then freeze-dried for 24-36 h to obtain powder of the fusion enzyme G3790 and powder of the fusion enzyme 3790G.

(4) Preparation of Orlistat Intermediate 7.5 kg of β-carbonyl methyl tetradecanoate and 9.375 kg of glucose were weighed and put in a 100 mL glass reactor, and then 25 L of a PBS buffer solution with a concentration of 50 mM and a pH value of 7.0 were added; a temperature of the reactor was controlled to keep at 35° C. by a high-low temperature cycling all-in-one machine; a mechanical stirring speed was adjusted to 180 rpm; then 18 g of NADP+ and 800 g of 3790G enzyme powder were added to obtain a mixed reaction liquid; a pH value was maintained at 7.0-7.5 by using a NaOH solution with a concentration of 2 M; the reaction process was monitored by HPLC; the reaction ended after 13 h; and a conversion rate was measured to be larger than 99%.

After the reaction was ended, the temperature was raised to 60° C. firstly, kept for 30 min and then cooled to 20-25° C.; suction filtration was conducted, and a filter cake was collected; 15 L of ethyl acetate was added to the filter cake for extraction and stirring for 20 min; and suction filtration was conducted, and an organic phase was collected. The filter cake was extracted and washed once again with 2 L ethyl acetate, and an organic phase was collected. The organic phases were combined; a product was concentrated under reduced pressure and then was slowly cooled; and a product was precipitated to obtain a crude product with a purity of 98.5% and an ee value of 98.6%. 2 times normal hexane by volume was added to the crude product for dissolution with heating; a product was crystallized with cooling; crystals were filtered and dried at a room temperature; 6.45 kg of white crystal product was collected and measured to have a purity of 99.70%, an ee value of 99.88% and a total yield of 86%.

Finally, it should be noted that the above embodiments are only used to illustrate the technical solution of the present invention and should not be considered as a limitation. Although the present invention has been described in detail with reference to the preferred embodiments, it should be understood by those skilled in the art that the modifications or equivalent substitutions could be made to the technical solution of the present invention without departing from the spirit and scope of the technical solution of the present invention and shall be all included within the scope of the claims of the present invention.

What is claimed is:

1. A composition, comprising:
a biological enzyme; and
a substrate, wherein:
the substrate is a β-carbonyl tetradecanoate which has the structural formula as shown in structural formula I;
the biological enzyme is a ketoreductase comprising the amino acid sequence shown as SEQ ID NO: 1 or SEQ ID NO: 2;
a weight ratio of the biological enzyme to the substrate is 1:1.1 to 1:150;
in structural formula I, R is any one of methyl, ethyl, n-propyl or isopropyl; and
structural formula I is:

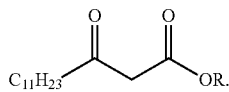

2. The composition in claim 1, wherein the biological enzyme is at least one of an enzyme powder, an enzyme solution and an immobilized enzyme.

3. The composition in claim 1, wherein a weight ratio of the biological enzyme to the substrate is one of 1:20, 1:30, 1:40, 1:50, 1:60, 1:70, 1:80, 1:90, 1:100, 1:110, 1:120, 1:130, 1:140 and 1:150.

4. A reaction system, comprising:
the composition of claim 1;
glucose;
a glucose dehydrogenase;
$NADP^+$; and
a buffer solution, wherein:
the glucose dehydrogenase comprises the amino acid sequence shown as SEQ ID NO: 3.

5. The reaction system in claim 4, wherein a pH value of the reaction system is 6.0-8.0.

6. The reaction system in claim 5, wherein the pH value of the reaction system is 7.0-7.5.

7. The reaction system in claim 4, wherein the buffer solution is a PBS buffer solution or a Tris-HCl buffer solution.

8. The reaction system in claim 4, wherein a concentration of the substrate is 20-150 g/L.

9. The reaction system in claim 4, wherein a concentration of $NADP^+$ is 0.1-0.5 g/L.

10. The reaction system in claim 4, wherein a molar ratio of compound I to the glucose is 1:1.2 to 1:4.

11. The reaction system in claim 4, wherein a concentration of the buffer solution is 0.01-0.5 mol/L.

12. A method for preparing an orlistat intermediate with the reaction system in claim 4, comprising the step of:
stirring the reaction system at 20-40° C. for reaction to obtain a reaction liquid of the orlistat intermediate, wherein:
an intermediate of the orlistat intermediate is (R)-β-hydroxytetradecanoate with a structural formula as shown in structural formula II;
in structural formula II, R is any one of the methyl, the ethyl, the n-propyl or the isopropyl; and
structural formula II is:

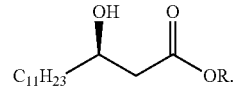

13. The method in claim 12, further comprising: regulating pH of the reaction system by addition of NaOH aqueous solution.

14. The method in claim 13, a concentration of the NaOH aqueous solution is 2 M.

15. The method in claim 12, wherein a reaction time of the method does not exceed 15 hours.

16. The method in claim 12, further comprising: extracting the reaction liquid with a solvent to obtain the orlistat intermediate.

17. The method in claim 16, wherein the solvent is anhydrous ethanol or ethyl acetate.

18. The method in claim 17, further comprising the steps of:
concentrating under reduced pressure the orlistat intermediate having been extracted;
cooling the concentrated orlistat intermediate and allowing it to crystalize; and
obtaining the orlistat intermediate having structural formula II as a white crystalline solid.

* * * * *